No. 787,994. PATENTED APR. 25, 1905.
W. P. SAWYER.
HARNESS SADDLE.
APPLICATION FILED MAY 8, 1901.
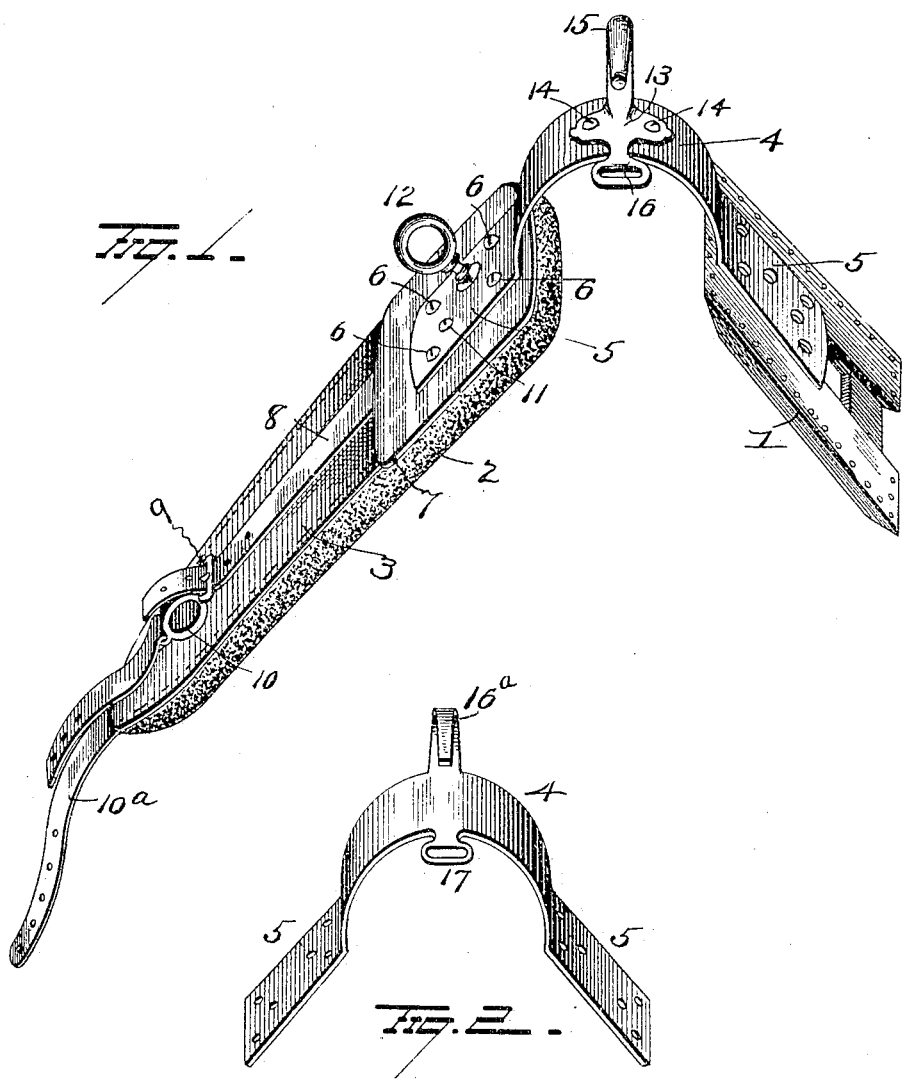
WITNESSES
INVENTOR No. 787,994.                                               Patented April 25, 1905.

UNITED STATES PATENT OFFICE.

WALTER P. SAWYER, OF JONESPORT, MAINE.

HARNESS-SADDLE.

SPECIFICATION forming part of Letters Patent No. 787,994, dated April 25, 1905.

Application filed May 8, 1901. Serial No. 59,266.

*To all whom it may concern:*

Be it known that I, WALTER P. SAWYER, a resident of Jonesport, in the county of Washington and State of Maine, have invented certain new and useful Improvements in Harness-Saddles; and I do hereby declare the following to be a full, clear, and exact description of the invention, such as will enable others skilled in the art to which is appertains to make and use the same.

My invention relates to an improvement in harness-saddles, an object of the invention being to provide a saddle which will not in any manner injure the animal's back or cause irritation or discomfort.

A further object is to provide an improved saddle which will be yielding or elastic to conform to the shape of the animal's back.

A further object is to provide an improved saddle which will be simple in construction, neat and attractive in appearance, comparatively cheap to manufacture, and strong and durable when in use.

With these objects in view the invention consists in certain novel features of construction and combinations and arrangements of parts, as will be more fully hereinafter described, and pointed out in the claim.

In the accompanying drawings, Figure 1 is a perspective view illustrating one half of the saddle complete and the other half incomplete, and Fig. 2 is a view illustrating a modified form of my invention.

1 represents a malleable-iron open-work tree of any desired shape, but preferably, as shown, perforated around its edge to receive stitching and secure the pad 2 to the bottom and sides of the tree, and the strap 3 (which may be of patent or enameled leather) on top thereof conforming to the shape of the pad and giving to the saddle a neat and attractive appearance. Each pad extends some distance below the tree to which it is secured, that portion of the pad below the lower end of the tree thus being flexible, so that it will readily adapt itself to the horse and yield sufficiently to prevent undue strain and pressure upon his muscles.

The pads are constructed in duplicate and connected and spaced apart by a metal arch 4, which comprises a bow-spring bent at an angle at its ends, forming flat plates 5, perforated for the reception of screws 6 to permanently secure the arch to the trees and pads, and short patent or enameled leather straps 7 are secured between the plates 5 and straps 3, as clearly shown in Fig. 1.

Thill-straps 8 are secured between the straps 7 and 3 by screws 11 and are connected by buckles 9 with thill-holders 10, and girth-straps 10$^a$ are secured to the trees and project from the ends of the pads. Terrets 12 are screwed through the plates 5, straps 7 and 3, and into nuts carried by the trees, and a casting 13 is secured by rivets or screws 14 to the top of the arch 4 and comprises the check-hook 15 and crupper-strap link 16.

Instead of securing a casting on the arch I might make the check-hook 16$^a$ and crupper-strap link 17 integral with the arch, as shown in Fig. 2.

It will be seen that with my improvements the open arch will prevent galling of the horse's back and the elasticity of the spring will permit of slight movement of the pads to conform to the shape of the animal, thus making the saddle comfortable and neat in appearance when in use and adapted to fit different animals.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

A harness-saddle comprising two trees of metal, a spring-bow having wings secured to the respective metal trees, short broad straps disposed between said wings and trees, a pad secured to each tree and extending a considerable distance below the lower end thereof, a broad strap over each pad and extending to the lower end thereof, girth-straps projecting from the lower ends of said last-mentioned broad straps and thill-straps secured at their upper ends between the said broad straps.

In testimony whereof I have signed this specification in the presence of two subscribing witnesses.

WALTER P. SAWYER.

Witnesses:
GEO. N. ROGERS,
JOHN V. SAWYER.